(12) United States Patent
Barrier (10) Patent No.: US 6,464,260 B2
(45) Date of Patent: Oct. 15, 2002

(54) LATCH SCREW COUPLING AND METHOD OF USING SAME

(76) Inventor: M. M. Buddy Barrier, 15134 Trailside Dr., Houston, TX (US) 77095

( * ) Notice: Subject to any disclaimer, the term of this patent is extended or adjusted under 35 U.S.C. 154(b) by 0 days.

(21) Appl. No.: 09/771,249

(22) Filed: Jan. 26, 2001

(65) Prior Publication Data

US 2002/0101076 A1 Aug. 1, 2002

(51) Int. Cl.⁷ .................................................. F16L 35/00
(52) U.S. Cl. ........................... 285/91; 285/912; 285/38; 285/39; 285/362; 285/377
(58) Field of Search .............................. 285/38, 39, 91, 285/92, 912, 362, 377

(56) References Cited

U.S. PATENT DOCUMENTS

| | | | |
|---|---|---|---|
| 977,472 A | * 12/1910 | Pilkington | .................... 285/38 |
| 980,677 A | 1/1911 | Rhoads | |
| 1,093,528 A | 4/1914 | Bowes, Jr. | |
| 2,558,247 A | * 6/1951 | Hamer | ......................... 285/39 |
| 2,613,089 A | 10/1952 | Maiman | |
| 2,664,918 A | * 1/1954 | Hamer | ....................... 285/912 |
| 2,825,039 A | 2/1958 | Schurman et al. | |
| 2,907,242 A | * 10/1959 | Chakroff | ...................... 285/39 |
| 3,039,794 A | 6/1962 | De Cenzo | |
| 3,162,470 A | 12/1964 | Davidson et al. | |
| 3,197,730 A | 7/1965 | Hargett | |
| 3,445,805 A | 5/1969 | McLoad | |
| 3,498,324 A | 3/1970 | Breuning | |
| 3,537,730 A | 11/1970 | Kresin | |
| 3,583,667 A | 6/1971 | Amneus, Jr. | |
| 3,613,726 A | 10/1971 | Torres | |
| 3,643,207 A | 2/1972 | Cairns | |
| 3,649,052 A | 3/1972 | Snyder, Jr. | |
| 3,719,918 A | 3/1973 | Kerr | |
| 3,808,579 A | 4/1974 | Mina et al. | |
| 4,040,650 A | * 8/1977 | Shotbolt | ...................... 285/912 |
| 4,085,943 A | 4/1978 | Travis | |
| 4,154,450 A | 5/1979 | Derbyshire | |
| 4,186,933 A | 2/1980 | Derbyshire | |

(List continued on next page.)

FOREIGN PATENT DOCUMENTS

| | | | | |
|---|---|---|---|---|
| DE | 872899 | * | 4/1953 | .................. 285/912 |
| DE | 2550517 | * | 5/1976 | .................. 285/912 |
| GB | 17810 | | 1/1914 | |
| GB | 993648 | * | 6/1965 | .................. 285/912 |
| GB | 2186044 | | 8/1987 | |

*Primary Examiner*—Eric K. Nicholson
(74) *Attorney, Agent, or Firm*—Akin, Gump, Strauss, Hauer & Feld, L.L.P.

(57) ABSTRACT

A mechanical coupling adapted for engagement using a key device. The coupling including first and second assemblies. The first assembly includes a latching body having a key hole, a coupling nut having an interior threaded portion and a toothed end portion, a receptacle body having an exterior threaded portion in constant threaded engagement with the interior threaded portion, and a first latch connected to the receptacle body. The second assembly includes a second latch and is adapted to engage the first assembly. The engagement of the first and second assemblies is accomplished by rotating a key device inserted in the key hole and meshing with the toothed end portion.

14 Claims, 5 Drawing Sheets

U.S. PATENT DOCUMENTS

| | | | |
|---|---|---|---|
| 4,402,533 A | * 9/1983 | Ortloff | 285/912 |
| 4,415,213 A | 11/1983 | Punako et al. | |
| 4,431,218 A | 2/1984 | Paul, Jr. et al. | |
| 4,433,725 A | 2/1984 | Bowyer | |
| 4,465,097 A | 8/1984 | Suzuki et al. | |
| 4,530,075 A | 7/1985 | Pearson | |
| 4,598,967 A | 7/1986 | White | |
| 4,634,202 A | 1/1987 | Taylor | |
| 4,754,780 A | 7/1988 | Smith, III | |
| 4,767,136 A | 8/1988 | Lehmann | |
| 4,768,551 A | 9/1988 | Allread et al. | |
| 4,813,454 A | 3/1989 | Smith, III | |
| 4,854,612 A | * 8/1989 | Cubric et al. | 285/912 |
| 4,990,022 A | * 2/1991 | Watanabe et al. | 285/912 |
| 4,993,260 A | 2/1991 | Bednarz | |
| 5,020,591 A | 6/1991 | Shore | |
| 5,026,024 A | 6/1991 | Ito | |
| 5,058,929 A | * 10/1991 | Zenter et al. | 285/39 |
| 5,360,035 A | 11/1994 | Smith | |
| 5,365,972 A | 11/1994 | Smith, III | |
| 5,388,874 A | 2/1995 | Barrier | |
| 5,469,887 A | 11/1995 | Smith, III | |

* cited by examiner

LATCH SCREW COUPLING AND METHOD OF USING SAME

CROSS-REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

The present invention relates to coupling mechanisms, and more specifically to couplings for mechanical, hydraulic and electrical systems.

2. Description of the Related Art

Quick connect/disconnect mechanical couplings are connecting devices which permit easy, immediate connection and separation of fluid lines and electrical conductors. Typically, mechanical couplings are made up of two members commonly referred to as a male or pin connector and a female or socket connector.

Mechanical fluid couplings are typically designed to provide rapid coupling and uncoupling of high pressure lines while at the same time providing a high degree of safety during both flow and non-flow conditions. It is important that the fluid coupling assures positive locking and a fluid-tight joint in the high pressure line. The mechanical fluid couplings are generally designed to assist in overcoming the resistive forces of joining the coupling members resulting from the fluid pressure in the lines.

A common fluid coupling designed to assist in joining the coupling connectors is the threaded coupling having a threaded coupling nut which is captured by a shoulder and a retaining ring on a first coupling connector. A second coupling connector has an externally threaded portion. As the coupling nut is threaded on the externally threaded portion of the second coupling connector, the coupling nut acts against the shoulder of the first coupling connector drawing the coupling connectors together. The same principle is used with dogs or lugs to engage camming surfaces within a locking sleeve of a coupling connector. There is also the bayonet coupling whereby dogs or lugs fixed to one coupling connector react against a cam surface on the other coupling connector as one member is rotated relative to the other. One good feature of threaded couplings is that they are not likely to disconnect accidentally.

A non-threaded type coupling is a push style mechanical coupling which involves the displacement of a spring-loaded sleeve. The displacement of the spring-loaded sleeve allows locking members to move radially outward as the pin is inserted into the socket. Once the pin is fully engaged, the spring-loaded sleeve is released. As the spring-loaded sleeve returns to its normal position, an interior cam surface forces and holds the locking members in the pin's groove, thereby locking the pin within the socket. Unlocking involves the reverse process. The locking members can be balls, pins, palls, wire rings, dogs, cams, collets, breech lugs, etc.

Electrical couplings do not encounter the high resistive forces of fluid couplings. However, electrical couplings must be sealed and polarized to ensure the proper coupling of the electrical conductors. Conventionally, electrical couplings achieve their polarization by an external-internal key and keyway usually in the proximity of the contacts. Sealing of the contact cavity is typically achieved by O-ring seal glands located in this same region. In order to achieve proper and timely key engagement and seal engagement without one interfering with the other, the coupling usually requires additional length of engagement and stepped diameters, thus increasing the complexity of the connector and thereby increasing manufacturing costs. The internal-external relationship of key and keyway results in one internal element being hidden from view while the other external element is obscured by the coupling ring. Inspection of the face of each connector will allow an approximate orientation of connectors prior to coupling, but indexing is strictly by feel upon engaging connectors, since the key and keyway are obscured. Obscure O-ring seal glands often result in failure of the coupling as a result of the seal glands not being properly in place or defective.

Threaded coupling arrangements are used extensively in mechanically coupled electrical connectors. The mechanical advantage as well as the relative unlimited travel make it a favorite in most applications over other types of couplings, such as lever or bayonet-type couplings. To perform as intended, it is necessary that the screw threads have proper maintenance such as protection, thread cleaning, and lubrication. The problems inherent with conventional threaded coupling arrangements are cross-threading and thread galling. Cross-threading may occur if the coupling members are not properly oriented and aligned when starting to engage the threads. Thread galling is the result of a contamination or burr being ground into the thread, creating a high stress or hot spot. This usually occurs on new parts being mated the first time. Conventional connectors are not necessarily sold as mated pairs and are therefore subject to being mated in the field for the first time. Additionally, a substantial reduction in efficiency and mechanical advantage results from resistance to thread make-up due to friction caused by corrosion, contamination, or improper lubrication. Conventional threaded couplers often are difficult to uncouple when the connectors have been made-up for an extended period of time in a hostile environment. Additionally, conventional connectors may suffer mashed, gouged, or bruised threads that may destroy the usefulness of the coupling connector.

Applicant's U.S. Pat. No. 5,388,874 discloses a mechanical coupling including a plug assembly and a receptacle assembly with each having an interior coupling member. The plug assembly has a coupling nut rotatably connected to a first latching body. The coupling nut includes a threaded portion that is maintained in constant threaded engagement to a threaded portion of an inner body. The receptacle assembly has a second latching body adapted to interconnect with the first latching body. The first and second coupling members are coupled together by rotating the coupling nut and advancing the first coupling connector towards the second coupling connector.

Two problems associated with making up pressurized hydraulic couplings having poppet-type internal valving are overcoming the force required to unseat the poppet and overcoming the separating force in drawing the valve bodies together to fully open the poppets.

It is desirable to have a mechanical coupling having the advantages of a threaded connection that can be coupled easily and quickly. It is further desirable that the coupling is adapted for coupling while under pressure. It is also desirable that the coupling provide mechanical advantages to overcome the force required to unseat the poppet and overcome the separating force in drawing the valve bodies together to fully open the poppets.

SUMMARY OF THE INVENTION

The present invention is for a coupling mechanism having a receptacle assembly and a plug assembly. The plug assembly includes a latch body, coupling nut, inner body, and a first coupler connector. The latch body is secured to the coupling nut in such a manner as to permit the coupling nut to rotate relative to the latch body. The coupling nut threadably engages the inner body, making up the plug assembly. The inner body moves longitudinally as the coupling nut is rotated. The first coupler connector is connected to the inner body.

The receptacle assembly includes a receptacle shell and a second coupler connector. The receptacle shell is constructed to accept the latch body. The receptacle shell and latch body connection can be accomplished by a variety of latches or interlocking mechanisms. The latch body and the receptacle shell are securely engaged by rotating the coupling nut clockwise which causes the inner body of the plug assembly to translate forward thereby securely engaging the receptacle shell. The continued clockwise rotation of the coupling nut results in the completion of the coupling connection of the first coupler connector and the second coupler connector. The coupling connection of the first coupler connector and the second coupler connector is effectuated by a permanently threaded engagement of the coupler nut and the inner body which is within a sealed chamber.

Rotation of the coupling nut counter-clockwise causes the inner body to retract or translate rearwardly to firstly disengage the coupling connection and secondly, disengage the receptacle shell from the inner body.

The present invention includes a plurality of gear teeth on the coupling nut and a key hole or socket in the latch body. A key device interacts with the plurality of gear teeth and the key hole to provide the mechanical advantage to unseat the poppet and break the seal. Breaking the seal of the poppet requires a small amount of axial movement. Thus, a high torque is required for only a small rotation of the coupling nut. The mechanical advantage provided by the present invention overcomes the high required torque.

Once the poppet seal is broken, the separating forces created by the pressure acting on the area of the opposing faces of the plug and receptacle becomes unacceptable in terms of bearing and thread loading rendering the torque requirements to rotate the coupling nut untenable. Thus, the present invention provides a passageway communicating fluid pressure to a chamber formed by seal glands on the outside diameter of the receptacle and the bore diameter of the latch body. The annular area is sized to provide a slight biased force toward coupling which in essence negates or nullifies forces providing a zero resultant force.

BRIEF DESCRIPTION OF THE DRAWINGS

The objects, advantages and features of the invention will become more apparent by reference to the drawings which are appended hereto and wherein like numerals indicate like parts and wherein illustrated embodiments of the invention are shown, in which.

DETAILED DESCRIPTION OF INVENTION

Figure 1:
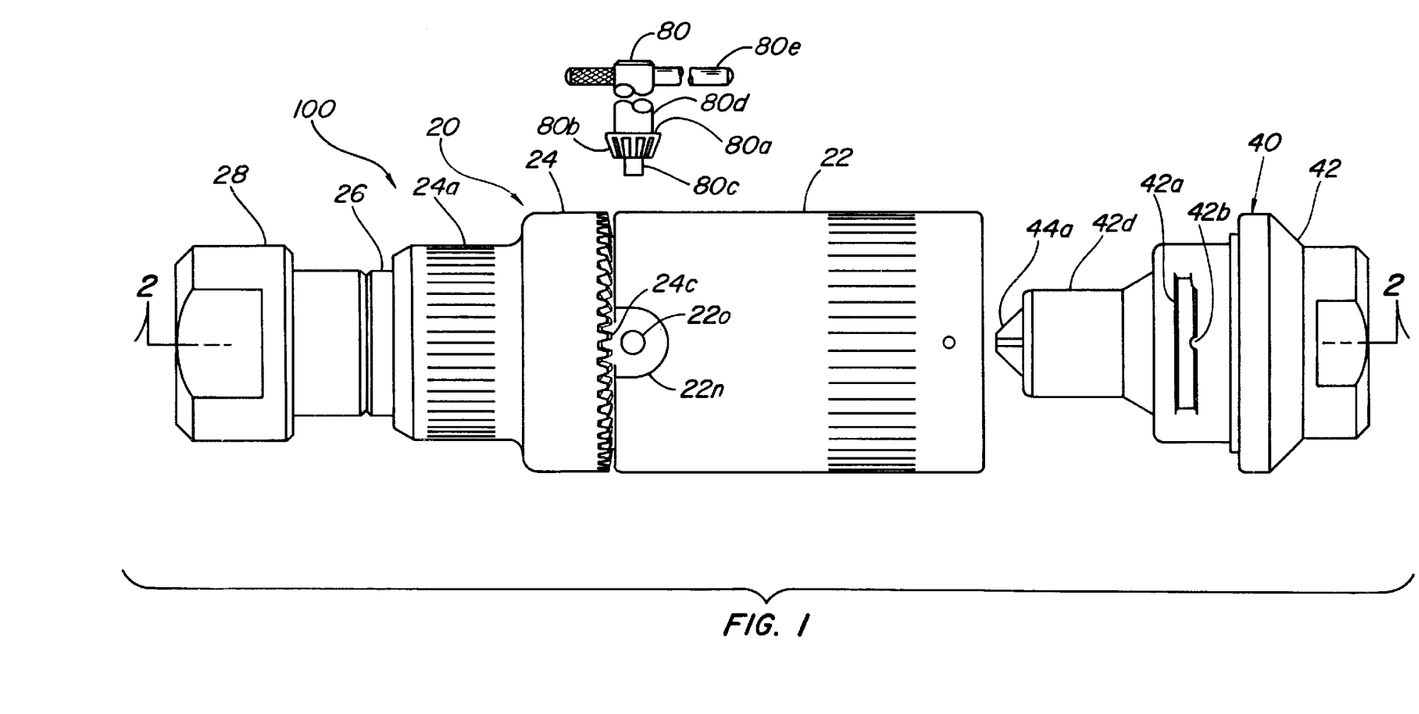
FIG. 1 is a side elevational view of a plug assembly and a receptacle assembly of a mechanical latch screw coupling according to an embodiment of the present invention in the uncoupled condition.
Figure 2:
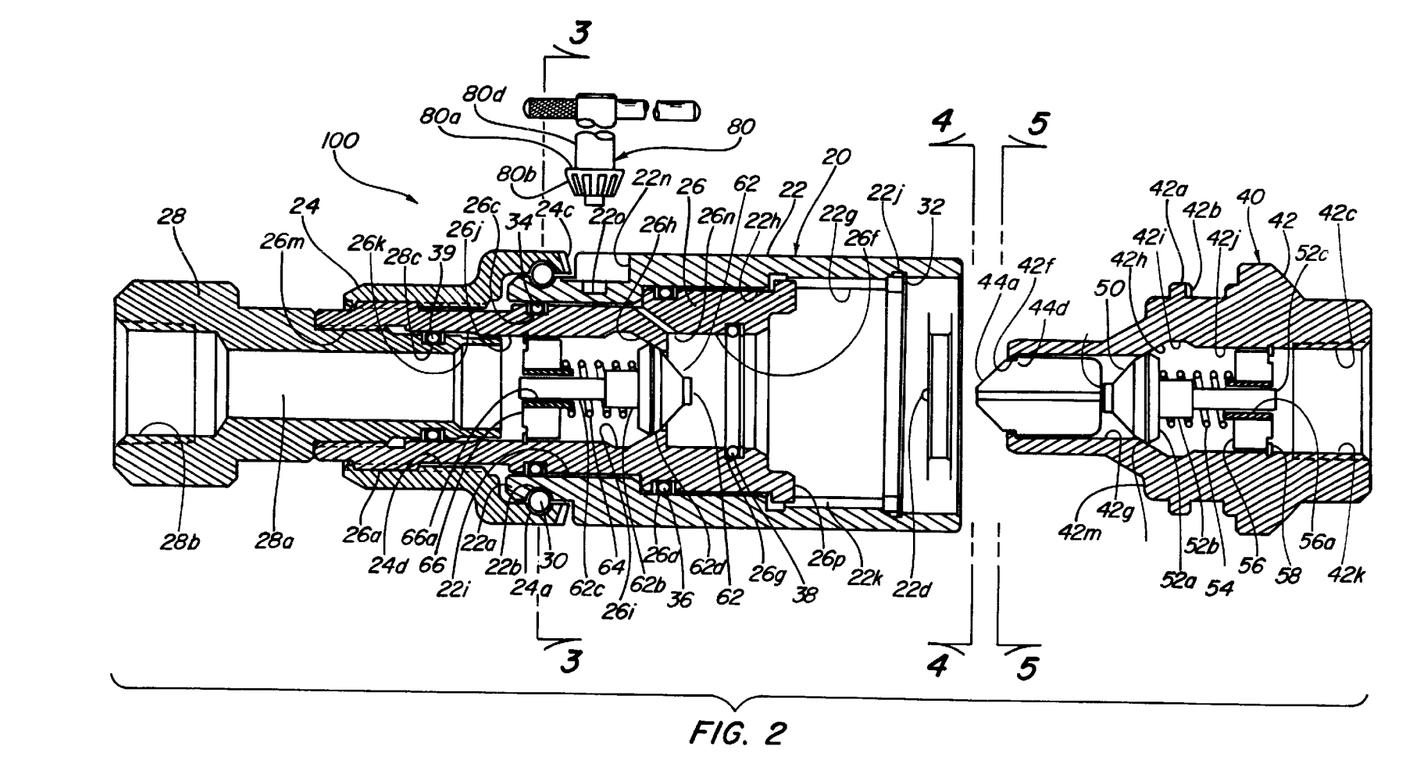
FIG. 2 is a section view taken along line 2—2 of FIG. 1.

Referring to FIGS. 1 and 2, a first embodiment of a mechanical latch screw coupling, designated generally as 100, is shown in an uncoupled condition. The mechanical latch screw coupling 100 includes a receptacle assembly 20 and a plug assembly 40. Preferably, the primary components of the latch screw coupling 100 are made out of materials resistant to corrosion, such as stainless steel. One such stainless steel is NITRONIC 50. NITRONIC 50 is a registered trademark of Armco, Inc. Applicant incorporates by reference his U.S. Pat. No. 5,388,874, titled "Quick Connect/Disconnect Latch Screw Coupling," issued Feb. 14, 1995.

Figure 3:
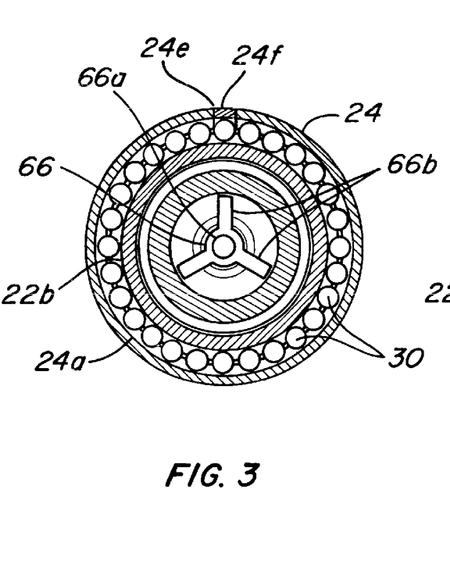
FIG. 3 is a section view taken along line 3—3 of FIG. 2.

Referring to FIG. 2, the receptacle assembly 20 includes a latch body 22, a coupling nut 24, a receptacle body 26, and an end adapter 28. A rear portion 22a of the latch body 22 is secured to the coupling nut 24 in such a manner as to permit the coupling nut 24 to rotate relative to the latch body 22. The rear portion 22a of the latch body 22 includes an external peripheral groove 22b which corresponds with an internal peripheral groove 24a in the coupling nut 24. As shown in FIGS. 2 and 3, a plurality of balls 30 are housed in the corresponding grooves 22b and 24a which maintain the coupling nut 24 in fixed axial relationship with the latch body 22. The balls 30 may be loaded or assembled through a hole or port 24e as shown in FIG. 3. The port 24e is plugged with a close fitting disc 24f. The close fitting disc 24f may be threaded or staked in place. Staking is a term used in machine shop practices whereby a center punch or other impact tool is used to deform the metal around the port 24e to capture or retain the disc 24f. It is to be understood that the coupling nut 24 can be axially connected to the latch body 22 by other means, as for example a thrust bearing.

Referring to FIG. 1, the external rear portion of the coupling nut 24 includes a gripping area 24b comprising a plurality of longitudinal lines inscribed in the outer surface to provide a gripping surface to manually rotate the coupling nut 24 as will be described below. Several other types of gripping surfaces, such as a knurled surface or a plurality of longitudinal grooves, could also be used. As shown in FIG. 1, the outer surface of the latch body 22 may also include a gripping area as described for the coupling nut 24.

Figure 4:
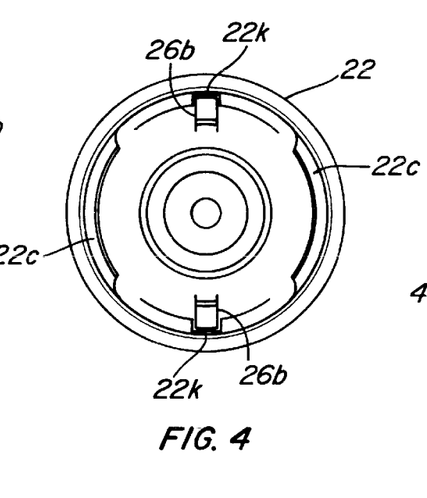
FIG. 4 is an end view of the receptacle assembly taken along line 4—4 of FIG. 2.
Figure 5:
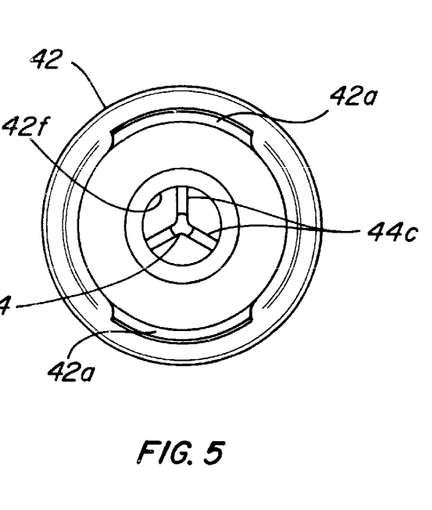
FIG. 5 is an end view of the plug assembly taken along line 5—5 of FIG. 2.
Figure 6:
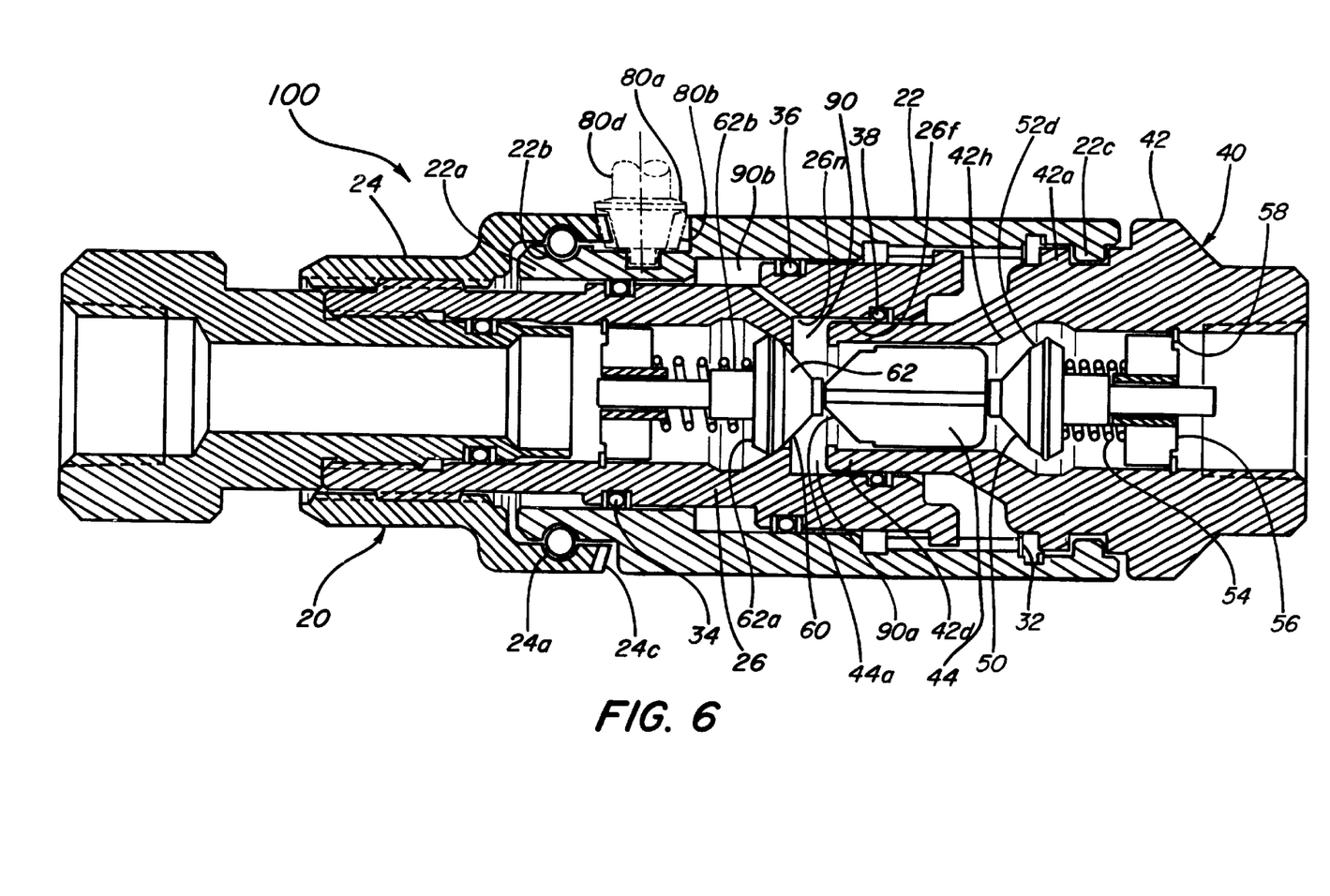
FIG. 6 is a side elevational view in section of the plug and receptacle assemblies of the mechanical latch screw coupling of FIG. 2 in an initial stage of the coupling process, the receptacle assembly rotated 90° about its longitudinal axis from the orientation shown in FIG. 1.

Referring to FIGS. 2, 4 and 6, the latch body 22 includes a pair of latch lugs 22c disposed opposite one another internally in the latch body 22. The plug assembly 40 includes a plug body 42 having a pair of protruding lugs 42a as shown in FIGS. 2 and 5. The protruding lugs 42a are oppositely disposed on the plug body 42. As will be explained in greater detail below, the protruding lugs 42a extend beyond the latch lugs 22c during the initial coupling process and the latch body 22 is rotated 90° to effectuate an interference fit between the latch lugs 22c and the protruding lugs 42a. Referring to FIG. 2, it may be desirable to provide a locking mechanism to maintain the interference fit of the lugs 22c and 42a. As shown in FIG. 2, a tab 22d on the latch lug 22c interacts with a tab recess 42b (FIG. 1) on the protruding lug 42a. A wavy spring or belleville washer 32 mounted in the latch body 22 provides a slight force against the protruding lugs 42a after engagement to assist in maintaining the interlocking fit of the lugs 42a and 22c.

Referring to FIG. 2, the latch body 22 has an internal bore 22e through which the receptacle body 26 is permitted to travel as will be explained below. The internal bore 22e includes four bore portions 22f, 22g, 22h and 22i. The first bore portion 22f includes the pair of latch lugs 22c. The first bore portion 22f includes a groove 22j to receive the wavy spring 32 as discussed above. The second bore portion 22g includes one or more keyways 22k. The second bore portion 22g ends with an enlarged circumferential recess 22m for reasons which will be explained below. The third bore portion 22h transitions to a reduced diameter at the fourth bore portion 22i.

As shown in FIGS. 1 and 2, the latch body 22 includes a key socket 22n and blind key hole 22o. The coupling nut 24 includes gear teeth 24c extending around the front periphery of the coupling nut 24. The coupling nut 24 further includes internal threads 24d that threadably engage external threads 26a on the rear portion of the receptacle body 26. As explained above, the coupling nut 24 is rotatably connected axially with the latch body 22 via the balls 30. It is to be understood that the rotatable connection between the coupling nut 24 and the latch body 22 could be effectuated by other means, as for example, a thrust bearing.

The receptacle body 26 includes a pair of outwardly facing keys 26b that are received in the keyways 22k of the latch body 22. The receptacle body 26 is thus mechanically interlocked, via the keys 26b and keyways 22k, to the latch body 22 to prevent rotation while allowing axial movement of the receptacle body 26 relative to the latch body 22. Rotation of the coupling nut 24 will translate the receptacle body 26 axially within the latch body 22. As shown in FIG. 2, a shoulder 26o located between the seal gland grooves 26c and 26d forms a stop by abutting with a transition shelf 22p to limit the rearward movement of the receptacle body 26 relative to the latch body 22.

Referring to FIG. 2, forward of the external threads 26a of the receptacle body 26 is a first seal gland 34 received in a groove 26c. Forward of the first seal gland 34 is a second seal gland 36 received in a groove 26d in the receptacle body 26. The first seal gland 34 forms a seal with the fourth bore portion 22i and the second seal gland 36 forms a seal with the third bore portion 22h of the latch body 22. It is to be understood that the third bore portion 22h has a greater diameter than the fourth bore portion 22i as shown in FIG. 2. The seal glands 34 and 36 mate or maintain contact with the seal surfaces on the cylindrical bore portions 22i and 22h, respectively, within the latch body 22.

The receptacle body 26 includes an internal throughbore 26e. The throughbore 26e includes a plug receiving portion 26f having a groove 26g for receiving a seal 38. The inner end of the plug receiving portion 26f transitions to a tapered face portion 26h. Preferably, the tapered face portion 26h transitions to a short, continuous diameter bore portion 26i for reasons which will be explained below. The internal throughbore 26e then includes a reduced diameter bore portion 26j which transitions to a slightly larger diameter bore portion 26k before terminating with an internally threaded bore portion 26m.

Referring to FIG. 2, the receptacle body 26 includes a passageway 26n extending from the plug receiving portion 26f to the outer surface of the receptacle body 26 between the first and second seal gland grooves 26c and 26d, respectively.

Referring to FIG. 2, the end adapter 28 is a tubular member having a throughbore 28a. The end adapter 28 includes a conduit connector 28b which connects to the conduit or hose being coupled. Still referring to FIG. 2, the end adapter 28 is threadably connected to the receptacle body 26. The end adapter 28 includes a peripheral groove 28c for receiving a seal 39, as for example an O-ring. The seal 39 forms a seal between the end adapter 28 and the receptacle body 26.

As shown in FIG. 2, a coupling receptacle valve assembly 60 includes a valve body 62 which is forwardly biased by a compression spring 64 acting against a rear face 62a of the valve body 62. A valve body hub 62b and a shaft 62c extend rearwardly from the rear face 62a of the valve body 62. A valve body guide 66 has an outer diameter adapted to be received in the reduced diameter bore portion 26j of the receptacle body 26. Preferably, the body guide 66 provides a fluid flowpath through the guide 66. In the embodiment shown in FIG. 3, the guide 66 includes a plurality of fins 66b that allows fluid to flow across the guide 66 in the reduced diameter bore portion 26j. It is to be understood that the present invention is not limited to the fin design shown in FIG. 3. Preferably, a snap ring 68 secures the axial location of the body guide 66 relative to the receptacle body 26. The valve body guide 66 includes a central bore 66a that receives the extending valve body shaft 62c. The compression spring 64 is positioned around the valve body shaft 62c and bears against the valve body rear face 62a and the valve body guide 66. When not in the coupled position, the spring 64 applies an axial force against the valve body 62 to seat a valve body face 62d with the receptacle body tapered face 26h.

Referring to FIGS. 2 and 5, the plug assembly 40 will now be described in detail. The plug assembly 40 includes the plug body 42 and a second conduit connector 42c. The protruding lugs 42a have been described above in detail. The plug body 42 includes a leading nose portion 42d and a through passageway 42e extending through the plug body 42. The front end of the nose portion 42d includes a peripheral inturned lip 42f at an end of the plunger bore portion 42g. The other end of the plunger bore portion 42g transitions to a tapered face portion 42h prior to preferably transitioning to a short, continuous diameter bore portion 42i for reasons which will be explained below. The through passageway 42e then includes a reduced diameter bore portion 42j that terminates with an internally threaded bore portion 42k of the conduit connector 42c.

As shown in FIG. 2, a coupling plug valve assembly 50 includes a valve body 52 which is forwardly biased by a compression spring 54 acting against a rear face 52a of the valve body 52. A valve body hub 52b and a shaft 52c extend rearwardly from the rear face 52a of the valve body 52. A valve body guide 56 has an outer diameter adapted to be received in the reduced diameter bore portion 42j of the plug body 42. Preferably, the body guide 56 provides a fluid flowpath through the guide 56 and is similar in construction to the body guide 66. Preferably, a snap ring 58 secures the axial location of the body guide 56 relative to the plug body 42. The valve body guide 56 includes a central bore 56a that receives the extending valve body shaft 52c. The compression spring 54 is positioned around the valve body shaft 52c and bears against the valve body rear face 52a and the valve body guide 56. When not in the coupled position, the spring 54 applies an axial force against the valve body 52 to seat a valve body face 52d with the plug body tapered face 42h.

Referring to FIGS. 2 and 5, the plug assembly 40 includes a plunger 44 slidably received in the plunger bore portion 42g. The plunger 44 includes a nose 44a which extends beyond the nose portion 42d of the plug body 42 in the uncoupled position of the latch screw coupling 100. The plunger 44 includes a tail end 44b which contacts the front end of the plug valve assembly 50 as shown in FIG. 2. Preferably, the plunger 44 provides a fluid flowpath across the plunger 44 from the nose 44a to the tail end 44b. As shown in FIG. 5, the plunger 44 includes a plurality of fins 44c that allows fluid to flow across the plunger 44 in the plunger bore portion 42g. It is to be understood that the present invention is not restricted to the fin design of the plunger 44 shown in FIGS. 2 and 5. Referring to FIG. 2, the plunger 44 is maintained in the nose portion 42d of the plug body 42 by the inturned lip 42f which bears against a shelf portion 44d of the plunger 44 when in the uncoupled position.

Referring to FIGS. 1 and 2, the coupling nut 24 incorporates gear teeth 24c such that the coupling nut 24 has a tooth gear ring on the circumferential surface adjacent the latch body 22 as described above. The key hole 22o is located at a prescribed distance from the pitch diameter of the coupling nut tooth gear ring 24c. The key hole 22o will accept a key device 80 similar to key devices used to lock and unlock drill chucks by engaging a toothed gear segment on a rotary chuck. The key devices 80 are commonly referred to as a "chuck key." In the present invention, the key device 80 is similar to a chuck key in appearance and function. The key device 80 has a gear head 80a including a plurality of teeth 80b. The teeth 80b have a pitch and profile to easily engage and mesh with the tooth gear ring 24c of the coupling nut 24. Protruding axially from the front face of the gear head 80a is a cylindrical pin or dowel 80c. To the rear of the gear head 80a is a larger cylindrical body 80d which may be configured in any number of ways to adapt to a handle, a chuck or other devices requiring prescribed geometries for gripping and/or imparting torque. Optionally, the cylindrical body 80d could include a profile or profiles to adapt to chucks or other devices for gripping and/or imparting torque. Examples of such devices include electric, pneumatic and hydraulic power tools to increase the speed and efficiency in coupling and uncoupling connectors.

The operation of coupling the present invention will now be explained in detail with reference to FIGS. 1, 2, 6 and 7. Initially, the coupling nut 24 has preferably been rotated so that the receptacle body 26 is in the fully retracted position with the receptacle body shoulder 26o contacting the latch body transition shelf 22p as shown in FIG. 2. The receptacle assembly 20 and the plug assembly 40 are brought into axial alignment and the nose portion 42d of the plug assembly 40 is inserted into the entrance of the plug receiving portion 26f of the receptacle body 26. Although not shown in FIG. 6, it is to be understood that prior to the nose portion 42d reaching the seal 38 in the receptacle body 26, the plug body protruding lugs 42a pass by the latch lugs 22c of the latch body 22 (FIGS. 4 and 6). The latch body 22 and the plug body 42 are rotated ninety degrees (90°) to effectuate an interference fit between the lugs 22c and 42a. The wavy spring 32 provides a slight force against the protruding lugs 42a to assist in maintaining the interference fit of the lugs 42a and 22c. It is to be understood that this initial step in the coupling process is accomplished with the valve assemblies 50 and 60 in sealing engagement with the plug body tapered face 42h and the receptacle body tapered face 26h, respectfully. It is also to be understood that fluid pressure may exist and exert pressure against the rear face 62a of the valve body 62 at this time.

Alternatively, the design of the latch screw coupling 100 may be such that the nose portion 42d of the plug body 42 reaches and engages the seal 38 in the receptacle body 26 prior to the plug body protruding lugs 42a passing by the latch lugs 22c of the latch body 22. In this design of the latch screw coupling 100, the latch body 22 and the plug body 42 are rotated ninety degrees (90°) to effectuate an interference fit between the lugs 22c and 42a with the seal 38 engaged between the receptacle body 26 and the plug body 42. It is also to be understood in this alternative design that the plunger 44 does not contact the valve assembly 60 in the receptacle assembly 20 during the initial engagement of the plug assembly 40 with the receptacle assembly 20.

The next step in the coupling process is to axially advance the receptacle body 26 relative to the stationary latch body 22 by rotating the coupling nut 24. The coupling nut 24 may be rotated manually by hand or by use of the key device 80 inserted into the key hole 22o of the latch body 22. The insertion of the key device 80 into the key hole 22o simultaneously engages the gear head teeth 80b with the teeth 24c of the coupling nut 24. Torque is imparted through the shank 80d causing the gear head 80a of the key device 80 to rotate the coupling nut 24. Torsional forces resisting the turning of the key device 80 are transmitted to the latch body 22 via the moment or couple created between the pitch diameter of the mating teeth 24c and 80b and the key hole 22o, which is the anchoring point of the key device 80. It should be noted that reactive torsional forces are linear to or parallel to the longitudinal axis of the receptacle assembly 20 and the plug assembly 40, as opposed to applying torque by a lever to the coupling nut 24 which imparts an axial torque requiring back-up wrenches to stabilize or counter the torque applied to the connection.

With reference to FIGS. 2 and 6, it is to be understood that upon the sealing engagement of the seal 38 with the nose portion 42d, a sealed chamber 90 is formed within a space defined by activated seal glands 34, 36 and 38, and the seated valve assemblies 50 and 60. The sealed chamber 90 is shown in FIG. 6 as having a first chamber portion 90a connected to a second chamber portion 90b via the passageway 26n. The sealed passageway 90 will be discussed in more detail below.

The continued advancement of the receptacle body 26 brings the receptacle assembly valve body 62 into contact with the plunger nose 44a. Upon contact of the plunger 44 and the valve body 62, the amount of torque (applied to the coupling nut 24) required to create further axial movement of the receptacle body 26 depends upon the magnitude of the fluid pressure acting against the rear of the poppet valve body 52d. The sealing force increases significantly based upon the pressure (fluid) and the area of the rear of the poppet valve body 52d (determined by flow requirements/ connector size) to the point of making it difficult if not functionally impossible to unseat the poppet valve body 52d. It is to be understood that breaking the seal of the poppet valve body 52d requires a small amount of axial movement. Thus, a high torque would be required for only a small rotation of the coupling nut 24.

The incorporation of gear teeth 24c as part of the coupling nut 24 and the key hole or socket 22n in the latch body 22 for insertion of the key device 80 provides the mechanical advantage to deal with significantly higher pressures and forces. Further rotation of the key device 80 allows the poppet valve body 52d seal to be broken. Once the poppet valve body 52d seal is broken, a separating force is created by the pressure acting on the area of the opposing faces of the plug and receptacle assemblies 40 and 26, respectively. The force acting to separate or disengage the plug assembly 40 and the receptacle assembly 26 is a function of the pressure acting on opposing areas of the plug and receptacle as defined by the diameter of the nose portion 42d of the plug assembly 40 and the seal gland 38 of the receptacle assembly 26. The separating force may become unacceptable in terms of bearing and thread loading rendering the torque requirements untenable. Hence, the passageway 26n communicates fluid pressure to the chamber 90b formed by the seal glands 34 and 36 on the outside diameters of the receptacle body 26 and the bore diameters 22i and 22h of the latch body 22. The annular area is sized to provide a force biased towards coupling the connectors, as opposed to uncoupling, to compensate for the difference in the efficiency of the coupling nut 24 in coupling versus uncoupling as determined by the lead, pitch, and friction of the threads resulting in the summation of forces (resultant force) approaching zero under static conditions. Essentially the only torque required in coupling and uncoupling will result from seal friction. Even though the use of the key device 80 in driving the coupling nut 24 may be essential or absolutely necessary at only one point during the coupling operation, that being to generate the force required to unseat the poppet valve body, it also offers utility in other ways that may surpass or be of more significance than the increased mechanical advantage it provides, particularly in other applications.

It is to be understood that the key drive (the coupling nut gear teeth 24c and key-type device) allows the use of compact prime movers such as electric and pneumatic power tools for increased torque and speed in coupling and uncoupling connectors. A right angle key drive enables connections to be made on the ground or on a bench such that connections do not have to be supported in order to rotate the coupling nut 24 with lever type devices such as wrenches. It also eliminates the need for backup wrenches in coupling and uncoupling connections. The key drive feature facilitates the use of extension members in connecting and disconnecting in remote or inaccessible locations.

Figure 7:
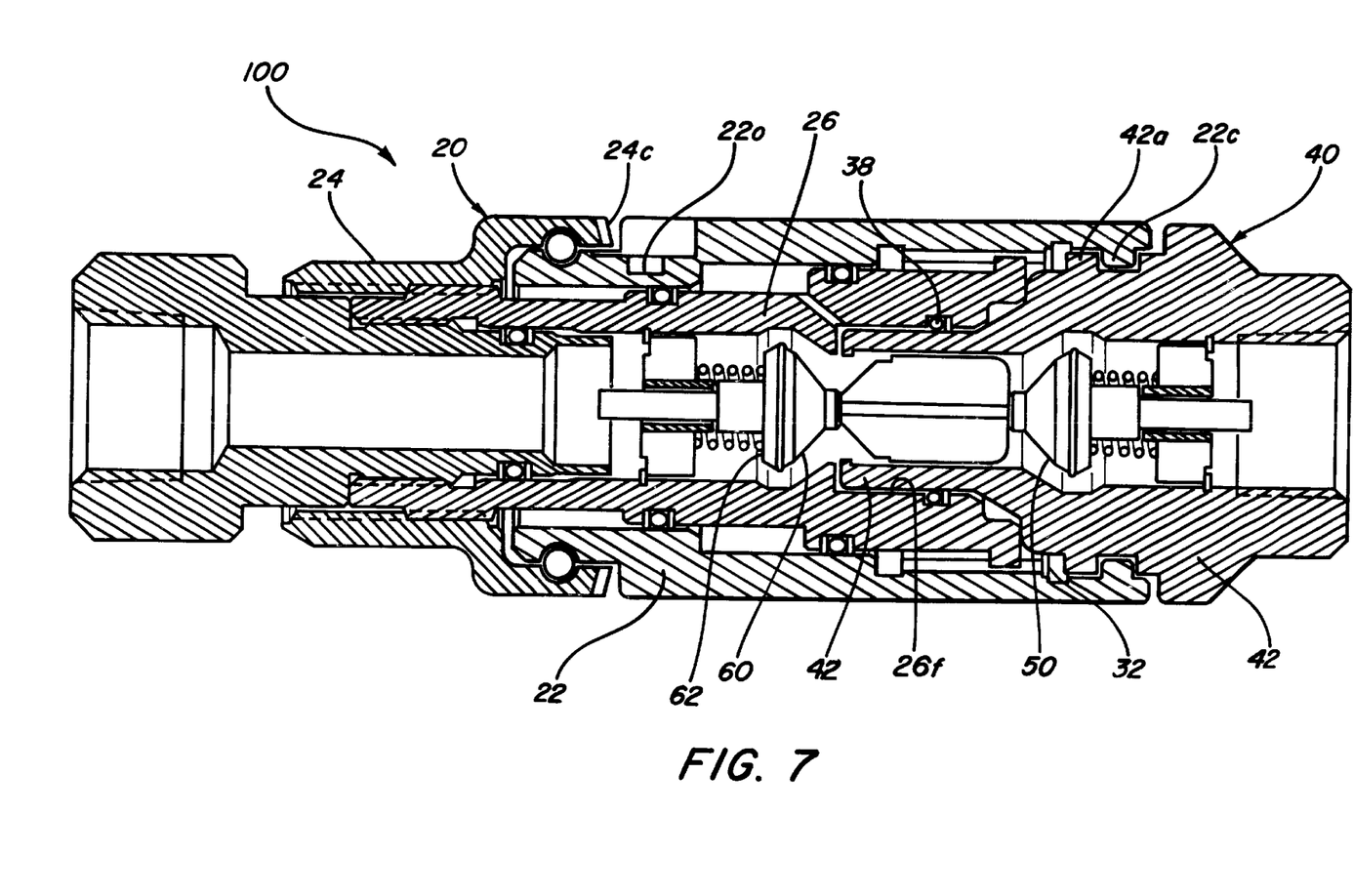
FIG. 7 is a side elevational view in section of the plug and receptacle assemblies of the mechanical latch screw coupling of FIG. 6 in a final stage of the coupling process.

The continued rotation of the coupling nut 24 results in the completion of the coupling connection of the receptacle body 26 and the plug assembly 40. As shown in FIG. 7, the continued forward translation of the receptacle body 26 results in the plug valve assemblies 50 and 60 compressing the compression springs 54 and 64, respectively, which in turn permits fluid flow through the fluid coupling 100. In the fully made up position of the coupling 100 as shown in FIG. 7, the forward movement of the receptacle body 26 may be restricted by contacting surfaces 26p and 42m (FIG. 2) of the receptacle body 26 and plug body 42, respectively.

It is to be understood that the utility of the key drive is applicable not only to hydraulic couplings but also mechanical and electrical couplings. The key drive is suited for use with Applicant's invention disclosed in U.S. Pat. No. 5,388,874 incorporated by reference herein. Certainly, the preferred embodiment of the present invention as described above is particularly adapted for high pressure hydraulic systems where it is desirable or necessary to connect and disconnect the coupling members while pressurized, requiring considerable force to unseat the poppet-type check valve and complete the coupling operation in overcoming the high forces in bringing the coupling halves together against pressure.

The foregoing disclosure and description of the invention is illustrative and explanatory thereof, and various changes in the size, shape, and materials, as well as in the details of illustrative construction and assembly, may be made without departing from the spirit of the invention.

What is claimed is:

1. A coupling adapted for engagement using a key device, the coupling comprising:

a first assembly, said first assembly comprising:
a latching body having a key hole;
a coupling nut having an interior threaded portion and a toothed end portion;
a receptacle body having an exterior threaded portion in constant threaded engagement with said interior threaded portion; and
a first means for latching connected to said latching body; and a second assembly separable from said first assembly, said second assembly adapted to engage said first assembly, said second assembly comprising a second means for latching adapted to interconnect with said first means for latching, wherein the engagement of said first assembly with said second assembly is accomplished by rotating a key device inserted in said key hole and meshing with said toothed end portion.

2. The coupling of claim 1, wherein said coupling nut is axially connected to said latching body.

3. The coupling of claim 2, wherein said coupling nut threaded portion and said receptacle body threaded portion are in a sealed chamber.

4. The coupling of claim 2, wherein said latching body is rotatably connected to said coupling nut such that said coupling nut is capable of rotating relative to said latching body.

5. The coupling of claim 1, wherein said first and second latching means are capable of matingly connecting with each other.

6. The coupling of claim 1, further comprising means for securing said first means for latching to said second means for latching.

7. A method for mechanically coupling a first conduit having a first assembly to a second conduit having a second assembly, wherein the first assembly includes a coupling nut rotatably connected to a latching body having a key hole, the coupling nut permanently threaded to a receptacle body and having a toothed end portion, and the receptacle body having a first coupling connector attached thereto, and wherein the second assembly includes a plug body and a second coupling connector attached thereto, the method comprising the steps of:

latching the first assembly to the second assembly;

rotating the coupling nut to translate forwardly the receptacle body to receive the plug body while maintaining the first and second coupling connectors in a closed position; and further rotating the coupling nut by rotating a removable key device, inserted into the key hole, meshed with the toothed end portion.

8. The method of claim 7, wherein said step of further rotating the coupling nut by rotating a removable key device engages the first coupling connector to the second coupling connector.

9. The method of claim 8, wherein said step of further rotating the coupling nut by rotating a removable key device places the first and second coupling connectors in open positions.

10. The method of claim 8, further comprising the step of removing the removable key device from the latching body and coupling nut.

11. The method of claim 7, wherein said step of latching the first assembly to the second assembly comprises joining the latching body of the first assembly to the plug body of the second assembly.

12. A hydraulic coupling adapted for engagement using a removable key device, the coupling comprising:
   a first assembly, said first assembly comprising:
   an outer latching body having a key hole;
   an outer coupling nut having an interior threaded portion and a toothed end portion;
   a receptacle body having a throughbore and an exterior threaded portion in constant threaded engagement with said interior threaded portion;
   a receptacle valve assembly mounted in said receptacle body throughbore; and
   a first means for latching connected to said latching body; and
   a second assembly adapted to engage said first assembly, said second assembly comprising:
   a plug body having a throughbore;
   a plug valve assembly mounted in said plug body throughbore; and
   a second means for latching connected to said plug body adapted to interconnect with said first means for latching,
   wherein the engagement of said first assembly with said second assembly is accomplished by rotating a removable key device, inserted in said key hole, meshing with said toothed end portion to provide forward translation of said receptacle body to said plug body.

13. The hydraulic coupling of claim 12, wherein said receptacle valve assembly engages said plug valve assembly as said receptacle body is forwardly translated to said plug body.

14. The hydraulic coupling of claim 13, wherein the engagement of said plug valve assembly with said receptacle valve assembly is accomplished by rotating the removable key device in said key hole.

* * * * *